United States Patent [19]

Rose et al.

[11] 3,833,173

[45] Sept. 3, 1974

[54] APPARATUS AND PROCESS FOR SPRAYING LIQUIDS

[75] Inventors: Clark B. Rose, Lagrange; Richard B. Kelley; Richard B. Ravitts, both of Rockford, all of Ill.

[73] Assignee: Richards of Rockford, Inc., Rockford, Ill.

[22] Filed: June 18, 1973

[21] Appl. No.: 370,734

Related U.S. Application Data

[63] Continuation-in-part of Ser. No. 273,181, July 19, 1972, Pat. No. 3,771,724.

[52] U.S. Cl................. 239/11, 239/221, 239/456, 261/120
[51] Int. Cl............................................. B05b 17/04
[58] Field of Search............... 239/11, 13, 8, 16, 23, 239/22, 219, 440, 456, 221; 210/15, 197, 220, 221; 261/120

[56] References Cited
UNITED STATES PATENTS

| | | | |
|---|---|---|---|
| 2,530,808 | 11/1950 | Cerasi | 239/440 |
| 3,416,729 | 12/1968 | Ravitts et al. | 239/16 |
| 3,622,074 | 11/1972 | Frohwerk | 239/11 |
| 3,640,514 | 2/1972 | Albritton | 261/120 X |

Primary Examiner—M. Henson Wood, Jr.
Assistant Examiner—Gene A. Church
Attorney, Agent, or Firm—Henry L. Brinks

[57] ABSTRACT

A pressure nozzle for spraying liquid as droplets substantially free from droplets of sizes that will form a mist which will drift. A conical liquid sheet is conducted along a conical wall that extends beyond the nozzle orifice. A tubular liquid sheet intersects the conical sheet on the conical wall, and the resultant conical stream which is discharged into the atmosphere, disrupts into droplets in a predictable manner.

20 Claims, 8 Drawing Figures

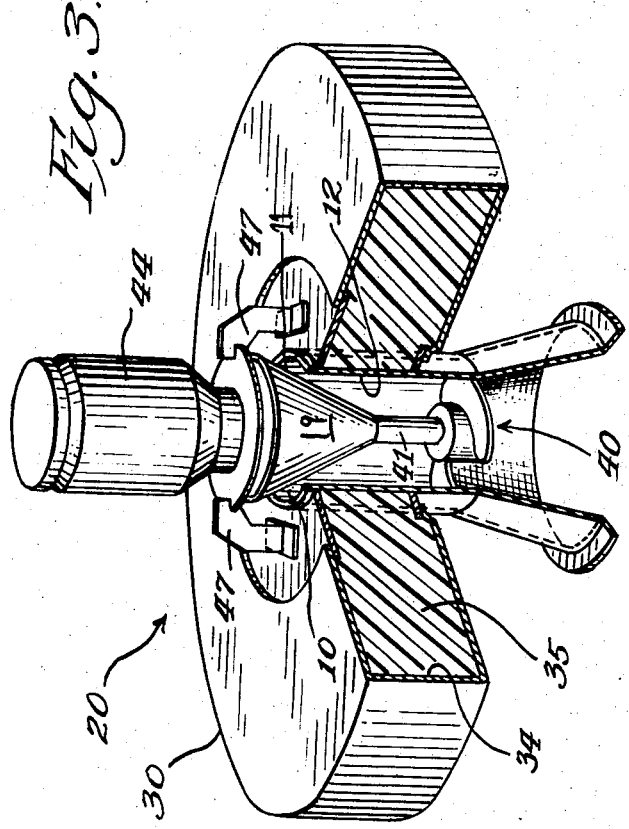
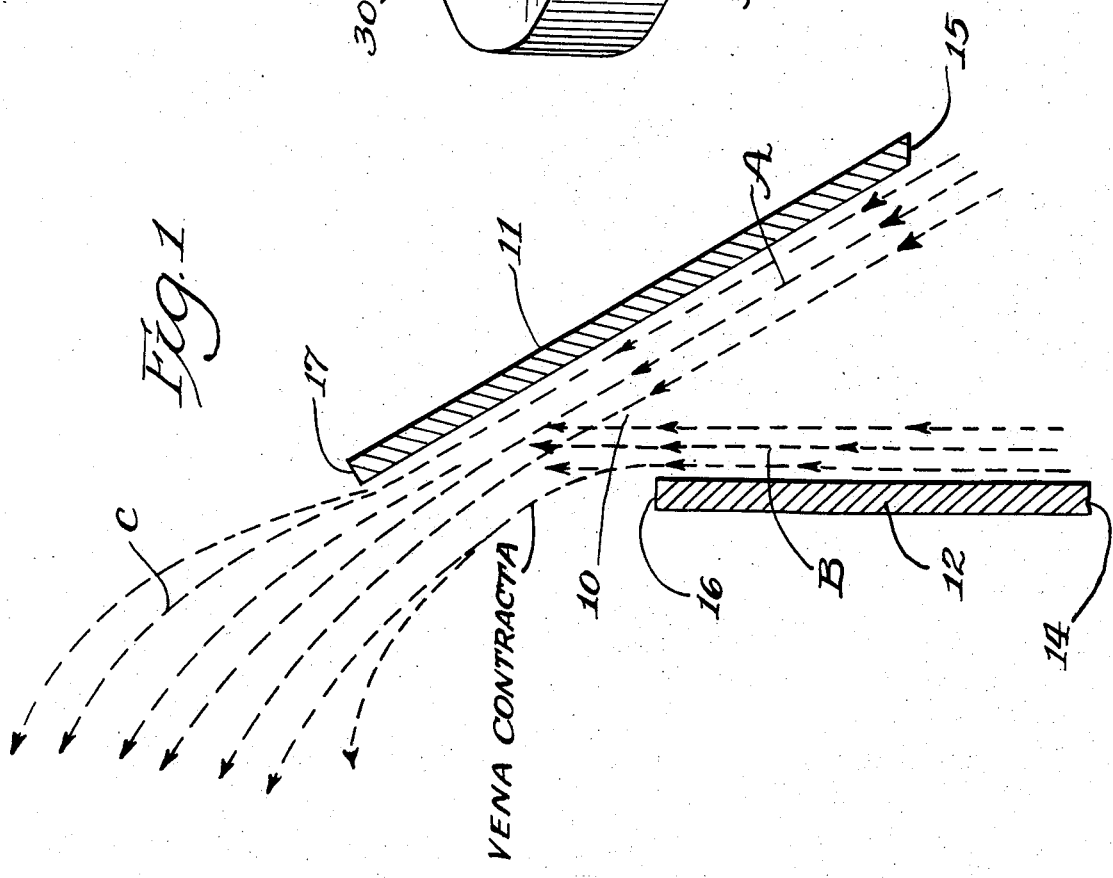

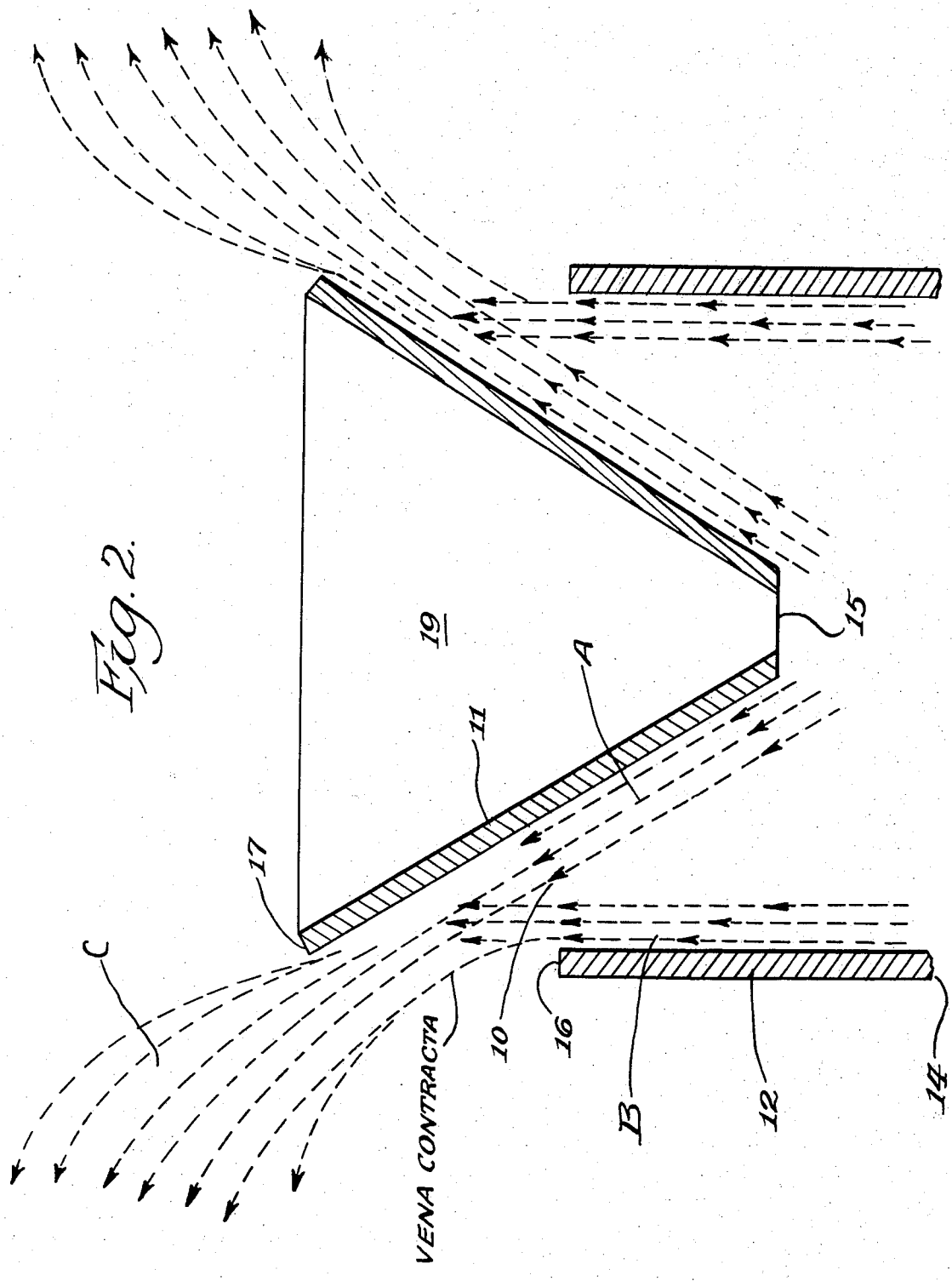

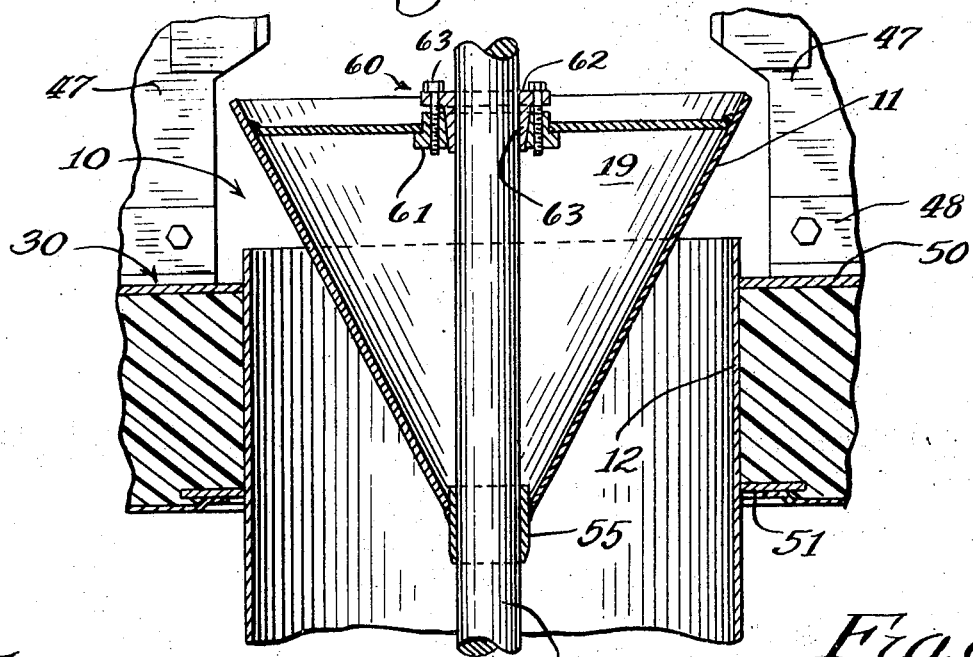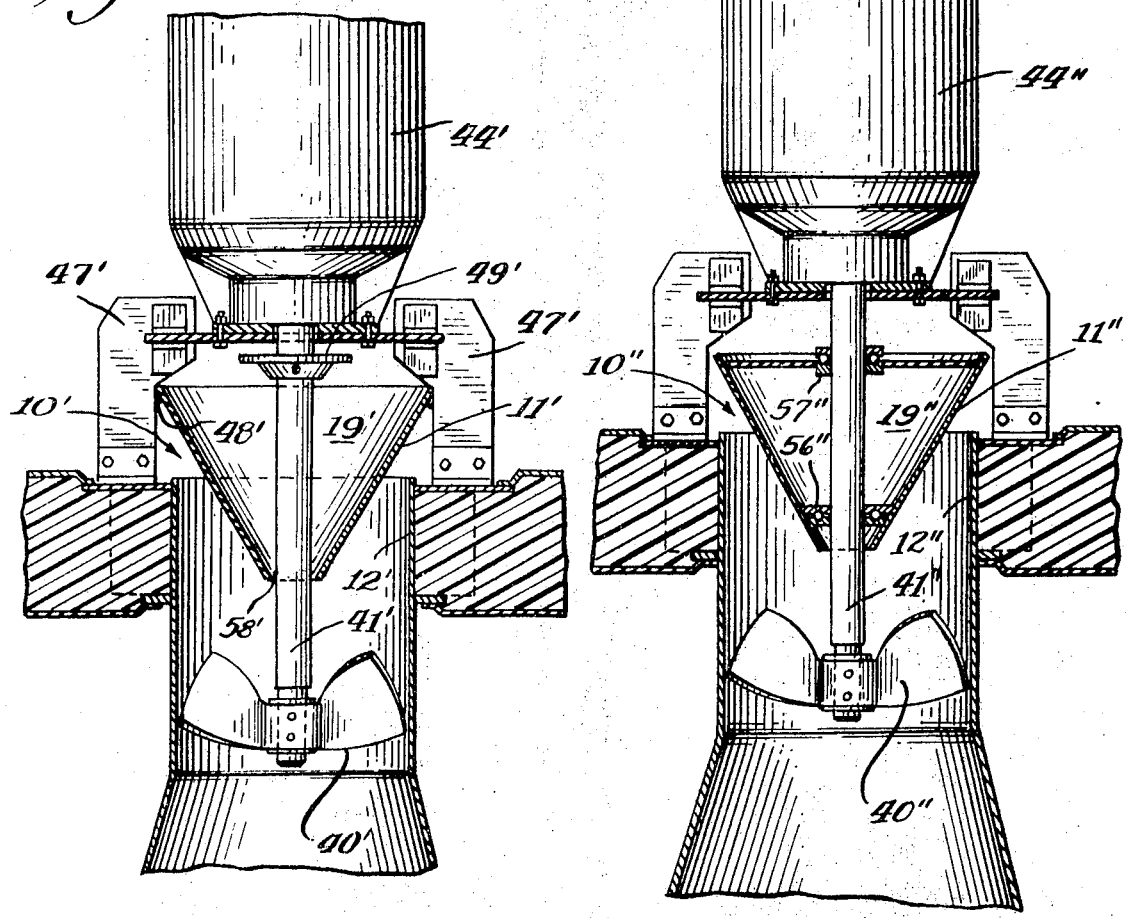

APPARATUS AND PROCESS FOR SPRAYING LIQUIDS

This application is a continuation-in-part of application Ser. No. 273,181, filed July 19, 1972, now U.S. Pat. No. 3,771,724.

FIELD OF THE INVENTION

This invention relates to an apparatus and method for spraying liquids usable for cooling, aeration, condensing, humidification or stripping of dissolved or entrained gases. More particularly, this invention relates to an apparatus and method in cooling water for optimizing the size range and number of the droplets in a water spray, the trajectory, and the ratio of velocity head to static head, in order to improve the approach to maximum heat transfer without undesirable atomization that creates a mist that will drift.

BACKGROUND OF THE INVENTION

The need for cooling, aeration, condensing, humidification or stripping of dissolved or entrained gases from liquids is well known. The burgeoning need for cooling large volumes of water in electrical utility generating plants, industrial condensing or cooling systems, and commercial and industrial air conditioning systems, also is well known. The expanding nuclear power industry in particular has been plagued currently with the problem of cooling large quantities of water in order to reduce the temperatures of the thermal discharge from generating stations for ecologically oriented reasons.

While cooling towers frequently provide a satisfactory solution to some cooling problems, there are many situations in which the demands for high volume cooling indicate cooling by spraying to be the desirable economically and technically feasible solution.

In cooling water by spraying, the cooling is largely caused by evaporation termed mass transfer. The heat exchange as the result of conduction between the air and water is termed sensible heat transfer. The total rate of heat transfer is a function of the water surface area which the air is able to contact and the humidity and temperature of the contacting air and the temperature of the water.

The total rate at which heat is removed from a particle of water by both sensible heat and mass transfer is given by the following formula:

$$Q_t = hA_d (T_\omega - T) + K_\omega A_d (\omega_\omega - \omega) \Delta \hat{H}_{vap}$$

Where:
- $Q_t$ = rate at which heat is removed by both heat and mass transfer; BTU/hr.
- $h$ = heat - transfer coefficient, BTU/(hr) (sq. ft.) (°F)
- $A_d$ = transfer area of the $H_2O$ drops (sq. ft.)
- $T_\omega$ = temperature of the $H_2O$ drops (°F)
- $T$ = temperature of the surrounding air (°F)
- $K_\omega$ = mass transfer coefficient ($1b_m$ $H_2O$/hr (sq. ft.) (unit humidity driving force on mass basis)
- $\omega_\omega$ = humidity of saturated air at temperature of spray ($T_\omega$), ($1b_m$ $H_2O$/$1b_m$ dry air)
- $\omega$ = humidity of saturated air at the temperature of surrounding air ($T_\omega$), ($1b_m$ $H_2O$/$1b_m$ dry air)
- $H$ = latent heat of vaporization of $H_2O$ at temperature of spray ($T_\omega$); BTU/$1b_m$ It will be observed from the foregoing that the rate at which heat is removed from the water particles is directly proportional to the surface area of the particles.

It is readily apparent from the above that less heat transfer will occur from a spray device that produces primarily a sheet of water than from one that produces droplets. More droplets, and therefore, the smaller size droplets, result in the greatest surface area, and therefore the greatest rate of heat transfer. On the other hand, if the droplet size is very fine, a mist is formed which can drift, cause damage to the surrounding areas, and produce adverse ecological disturbances. Spray devices for salt water are potentially troublesome, since any mist drift can cause especially severe damage. Water in mist also reduces the cooling efficiency because cold water is lost from the system.

Spray devices can be used advantageously to aerate water to prevent stagnation, to enrich the oxygen content of the water, to humidify air, or to strip dissolved or entrained gases from water or liquids. In each of the foregoing uses droplet size in the spray is important to the efficiency of the device.

Heretofore, a wide variety of spray nozzles have been employed for atomization of liquids. They may be classified as: spinning mechanical nozzles; pressure nozzles; and gas atomizing nozzles. Certain specialized nozzles are a combination of the foregoing, such as a combination of gas and spinning mechanical atomization. A form of mechanical spinning nozzle for cooling water is illustrated in Ravitts U.S. Pat. No. 3,416,729. The common pressure nozzle for atomization has a spiral through which the water passes at high velocity. As it leaves the orifice, centrifugal force disrupts the water and shatters it into the numerous droplets of spray.

SUMMARY OF THE OBJECTIVES OF THE INVENTION

A general object of the present invention is to provide a new and improved pressure nozzle for generating an improved liquid spray, and which is adaptable for use in a spray unit operable to accomplish heat, air, water, or gas transfer to or from a liquid.

A further object is to provide a spray nozzle which achieves improved droplet size of the spray so as to achieve improved performance in the economical transfer of heat and/or water vapor into the surrounding atmosphere.

A still further object is to provide a spray device for controlling the spray trajectory and/or energy optimization through control of the ratio of velocity head to static head at the orifice.

In environmental conditions where prevailing atmospheric wind velocity is high, and where wind drift or loss from the spray presents the possibility of undesirable contamination of the surrounding area, there is a need for minimizing the mist. Accordingly, it is a further object of the invention to provide a spray device that produces minimal mist drift loss, and, further, which may be adjusted to vary the mist drift loss while optimizing the ratio of static head to velocity head available from the pump or energy source, thereby to optimize the performance of the spray unit to existing conditions and attain maximum transfer of heat and/or water vapor to the atmosphere. It is another objective of the invention to provide a novel spray nozzle which disrupts the liquid discharged from a nozzle and causes it to shatter into numerous droplets of a size range for improving the approach to optimum heat transfer.

It is yet another object of the invention to provide a nozzle and spray device, especially suitable for spraying large quantities of liquid at a high rate.

It is another object of the invention to provide a method and apparatus which reduces the cost of cooling, aeration, condensing, humidification, or stripping of entrained gases from liquids.

Further objects of the invention will be apparent from a review of the attached specification and appended claims.

BRIEF DESCRIPTION OF THE DRAWINGS

FIG. 1 is an enlarged fragmentary diagrammatic view of a nozzle embodying the principles of the invention.

FIG. 2 is an enlarged fragmentary diagrammatic view of a nozzle for producing a conical spray embodying the principles of the invention.

FIG. 3 is a fragmentary perspective view of a form of the invention employed in a floating spray unit embodying the novel features of the invention.

FIG. 6 is an enlarged fragmentary view of the nozzle of the spray device illustrated in FIGS. 3 and 4.

FIG. 7 illustrates a modified form of spray device incorporating the principles of the invention.

FIG. 8 illustrates another form of spray device incorporating the principles of the invention.

DETAILED DESCRIPTION OF THE PREFERRED EMBODIMENTS

Briefly stated, the present invention relates to a novel pressure nozzle that projects liquid as a spray of numerous droplets. It is a discovery of the invention that droplets of a desired size range and number are produced by generating a sheet of liquid on one side of a nozzle orifice which is intersected by at least one other sheet against a wall prior to the discharge of the resulting liquid stream.

In one form of the invention, two liquid sheets leave the nozzle orifice at a predetermined controlled angle acute to each other, and one sheet impinges against the other on a wall positioned outside of the orifice. The velocity and angular relationships of these two sheets cause the resulting liquid stream to disintegrate in a predictable way, resulting in predetermined average size range and number of particulate droplets. The droplets are ejected to a selected height into the atmosphere in a trajectory for optimum dwell time, for the minimization of droplet coalescence, and for the minimization of wind drift.

In a preferred form of the invention, the radial width of the orifice is selectively adjustable so that, if desired, the thickness of the resulting liquid stream exiting the orifice may be varied. In this way, the radial width of the stream of water exiting the orifice may be reduced so as to increase the static head from the pump or energy source; conversely, adjustment of the radial width of the orifice can be increased to reduce the height of the spray and the diameter of the spray pattern thereby to increase the flow rate or velocity head from the pump or energy source.

In the instant embodiment of the invention, a conical sheet of liquid is formed on an inverted conical wall which is intersected by a tubular sheet of liquid on the conical wall to form a resulting conical spray which disintegrates into droplets as it is discharged upwardly into the atmosphere.

In one form, the nozzle of the invention is usable on the spray unit as a self-contained assembly with its own pump supported on a buoyant float anchored in any desired location or with other units in a pattern in a channel, pond, lake, or tank. The nozzle may be used equally advantageously, however, with spray units having fixed supports, such as a pier, stand, or truss-mount pier. In some instances, it may be advantageous to remotely locate a pumping unit from the spray unit.

Referring now to FIG. 1, a nozzle illustrating the principles of the invention is diagrammatically depicted. Liquid under pressure is supplied to the nozzle orifice 10 from which it is projected into the atmosphere as it is guided along the surface of wall member 11. The wall member 11 extends from an inlet end 15 to an outlet end 17, the latter of which terminates at a point downstream from the orifice 10. The inlet end 15 is positioned a distance upstream of the orifice 10 sufficient for generation of a unidirectional sheet of liquid A along wall 11, which sheet is laminar adjacent the wall 11, that is conducted downstream to, and outside of, the orifice. A second wall 12 is positioned to generate a second unidirectional sheet of liquid B along wall 12, which second sheet is laminar adjacent wall 12, and to direct such second sheet B for intersection with the first sheet A along the extent of wall 11 exterior to the orifice and before the end 17. The resulting steam of liquid C formed by intersecting sheets A and B is turbulent and unstable, and disrupts and shatters into droplets as it is projected into the atmosphere.

The second wall member 12 has an inlet end 14 and an outlet end 16, the latter of which is spaced from the wall member 11 to form the orifice 10. The outlet end of the wall 12 is spaced from and positioned so that the two sheets A and B intersect within the extent of wall 11 between the inlet end 15 and the discharge end 17. The distance between the end 16 of wall 12 and wall 11 is substantially constant along the peripheral edge of end 16, but may be selectively adjusted in order to vary the thickness of the resulting sheet C and to change the droplet size as will be more fully explained hereinafter. The end 16 of wall 12 is spaced from wall 11 so that the total area of the orifice 10 is less than the supply conduit in order to obtain a predetermined increase in the velocity pressure head of the liquid relative to the static head at the nozzle orifice.

The wall 12 is offset from parallel with respect to wall 11 at an acute angle so that the liquid sheet on wall 12 intersects liquid sheet on wall 11 at an acute angle. The acute angle between wall 12 and wall 11 illustrated in the drawings is 30°, although it may vary widely in the range from about 10° to about 80°. The orifice between the walls 11, 12 normally would produce a vena contracta in the discharged stream.

The wall 11 extends at least beyond a point corresponding to the inside surface of wall 12 if the latter were extended beyond orifice 10. The wall 11 thereby provides an area for intersection of the two sheets and for effectively guiding the trajectory of the emerging stream. It has been determined that a majority of the droplets produced by the nozzle of the invention are in the size range from 0.25 inch to to about 0.75 inch. It has also been determined that the spray produced by the nozzle of the invention is substantially free from droplets of a size less than about 30 microns which cause mist that can drift.

Referring now to FIG. 2, a specific form of nozzle illustrating the principles of the invention is diagrammatically depicted. The wall member 11 is the wall of an inverted right cone 19. The cone 19 may be truncated or frusto-conical as illustrated. The conical wall 11 of cone 19 extends from the apex or inlet end 15 to the base or discharge end 17, the latter of which terminates in a circle with an abrupt edge positioned downstream from the nozzle orifice 10. The apex end 15 of the cone is positioned a distance upstream from the orifice 10 sufficient for generation of a unidirectional, conical sheet of liquid A along the conical wall 11, the conical sheet being laminated adjacent the wall and conducted downstream to, and outside of, the orifice 10. A tubular conduit wall 12 is positioned to generate a tubular sheet or sleeve of liquid B along the wall 12, which is laminar adjacent to wall 12, and to direct the tubular sleeve of liquid B for intersection with the conical sheet A along the extent of wall 11 exterior to the orifice and adjacent to the discharge end 17. The resulting conical stream of liquid C formed by the intersecting sheets A and B is turbulent and unstable and disrupts and shatters into droplets as it is projected into the atmosphere.

The conical stream C is guided into the atmosphere along a trajectory determined by the angle of the side wall 11. The optimum trajectory is a compromise of the maximum dwell time of the droplets, minimization of droplet coalescence, and minimization of wind drift.

The conduit wall 12 terminates in an abrupt circular edge 16 spaced from the conical wall 11 to form a circular, ring-shaped orifice 10. The conduit wall 12 has a fixed diameter for the axial extent adjacent the orifice 10 in order to form the tubular sleeve of liquid B.

The area of the ring-shaped orifice opening is the space circumscribed by the inner periphery of the conduit 12 and the outer periphery of cone 19 which defines the smallest distance between the conduit end 16 and the wall 11. The area of orifice 10 is substantially less than the cross-sectional area of conduit 12 so as to increase sharply the dynamic pressure of the liquid at the orifice over the dynamic pressure of the liquid in the conduit spaced from the nozzle. If the ratio of the dynamic pressures to static pressures of the liquid are compared between the nozzle orifice and the conduit, the cross-sectional area of the nozzle should be sufficiently less than the cross-sectional area of the conduit so as to significantly increase such ratio at the orifice as compared to the conduit.

The diameter of the base 17 of the cone is greater than the interior diameter of the conduit 12 so that the tubular sheet B will impinge against the conical sheet A on the wall 11 prior to discharge into the atmosphere. The diameter of the base 17 is sufficiently small to prevent reforming of the turbulent, unstable stream C into a laminar sheet prior discharging into the atmosphere. For this reason, the diameter of the base preferably is of a size so that the wall 11 terminated downstream from and adjacent to the vena contracta or the area on the wall 11 at which the sheets A and B intersect.

The nozzle disclosed in FIG. 2 can be used in a wide variety of spray units. It may be used with spray units having fixed supports, such as a pier, stand, or truss-mounted pier. The source of liquid pressure for the conduit may be a pumping unit remotely located from the spray unit.

In one embodiment of the invention shown in FIGS. 3 to 8, the nozzle of the invention is employed on a spray unit which is a self-contained assembly with its own pump supported on a buoyant float which may be anchored at a desired location by itself or with other spray units in a channel, pond, lake or tank.

The cone 19 may be rotated, fixed or free-spinning relative to the conduit 12, as long as the principles of the invention shown and described in connection with FIGS. 1 and 2 are observed.

Referring now to FIGS. 3 to 6, there is illustrated an embodiment of the invention in which the cone 19 in the nozzle is rotated. As best shown in FIG. 3, the nozzle is employed in a spray unit 20 supported on the surface of a body of liquid by buoyant float 30. The spray unit on the float may be moored at a selected location in a parent body of liquid by stringing cables (not shown) from the shore to suitable eyes 31 (FIG. 4) on the float. The outer shell 34 of the float may be formed of stainless steel and filled with a low density material 35, such as polyurethane foam.

The spray unit 20 incorporates pump in the form of a propeller or turbine 40 fixed to shaft 41 and driven by an electric motor 44 to propel liquid upwardly in conduit 12. An inverted right cone 19 is fixed to rotating shaft 41 in a position to incorporate the principles set forth heretofore in connection with FIGS. 1 and 2.

Referring now to FIG. 4, it is seen that the propeller 40 incorporates angularly spaced plates 43 radiating outwardly from the shaft 41 to propel the water upwardly through conduit 12. At the lower inlet end, the pump intake may depend from a throat 37 with a downwardly flaring intake shroud 39 immersed in a liquid to establish an entry into the throat 37. The spray unit, however, will function with or without the intake shroud. The use of the shroud will control the depth from which liquid is drawn, thus controlling the liquid performance in the parent body of liquid. Similarly, various intake arrangements are possible for the spray unit.

As best shown in FIGS. 4 and 5, the electric motor 44 is mounted on platform 45 which is supported above the float 30 by a plurality of upstanding legs 47. The legs 47 are supported at their lower ends between a pair of flanges 48 on a ring 50 extending radially outwardly from the conduit 12. The upper ends of the legs are secured to platform 45.

A ring 51, spaced below ring 50, projects radially outwardly from conduit 12. The shell of float 30 is secured to the rings 50 and 51.

As best shown in FIG. 6, the cone 19 journals the shaft 41 at its lower end by a sleeve 55, but is fixedly secured at its upper end to shaft 41 by a press fitting 60. The fitting has element 61 with an inner cam surface secured to the base of cone 19, and an element 62 provided with wedge members 63 between the cam surface of the element 61 and the shaft 41. Bolts 63 between elements 61 and 62 are used to force the wedge member 63 against the shaft 41 to provide securement between the cone and the shaft.

The fitting 60 allows the cone to be adjusted to selected positions along the axis of shaft 41. It is only necessary to loosen the fitting from the shaft by bolts 63 for adjustment of the size of the nozzle orifice 10. After the selected nozzle orifice size is made, the bolts are tightened again to fix the cone to the shaft.

Figure 5:
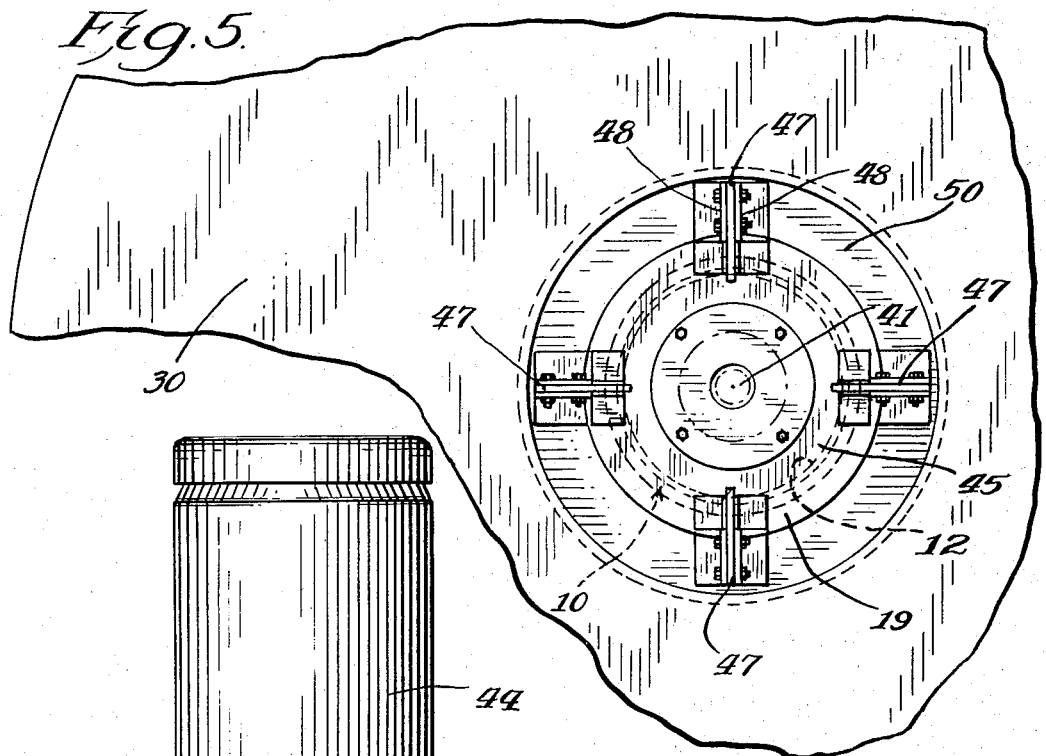
FIG. 5 is a sectional view taken along line 5—5 of FIG. 4.
Figure 4:
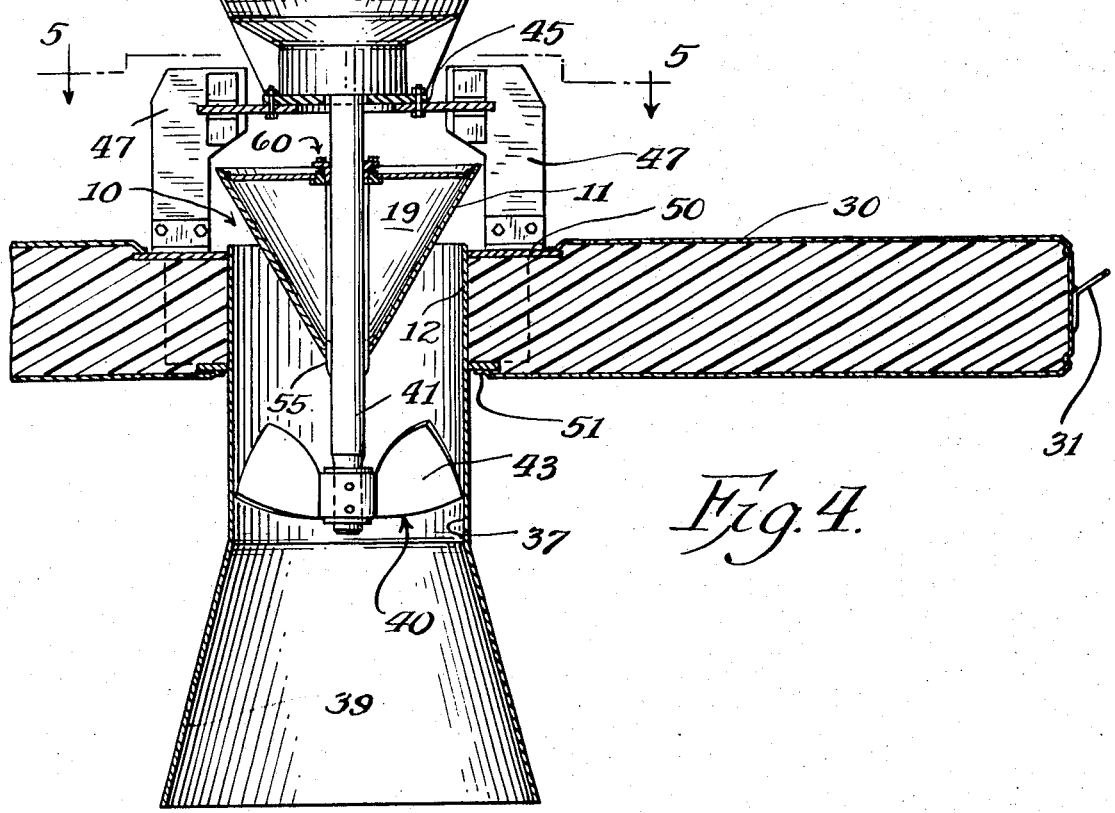
FIG. 4 is a cross-sectional view of the floating spray unit depicted in FIG. 3 with some of the parts in elevation.

Although the cone 19 in FIGS. 3 to 6 rotates with the shaft that drives the impeller or pump, the cone may be fixed, or free rotating, and incorporate the principles of the present invention. Referring to FIG. 7, there is shown a spray unit similar to the form described in connection with FIGS. 3 to 6, except the cone 19' is fixed relative to the conduit 12'. As shown, the cone 19' is secured as by welding to leg 47' at 48'. The lower end of the cone 19' has an opening 58' which permits rotation of the drive shaft 41' rotated by motor 44' for pump or impeller 40'. A slinger 49' is attached to the drive shaft 41' as shown in Ravitts U.S. Pat. No. 3,416,729 to prevent water from entering motor bearings along shaft 41'. The conical wall 11' of the cone 19' forms a biangular nozzle with the conduit 12' at orifice 10' in accordance with the principles set forth above in connection with FIGS. 1 and 2.

Referring to FIG. 8, there is shown a spray unit similar to that shown in FIGS. 3 to 6, except that the cone 19'' is free rotating on the shaft 41''. The base of the cone 19'' is rotatably mounted on shaft 41'' by a radial-thrust bearing 57'', and the apex end of the cone is rotatably mounted on shaft 41'' by radial bearing 56''. As the motor 44'' drives the impeller 40'' by shaft 41'', the cone 19'' is allowed to free wheel on the shaft through bearings 55'' and 56''. The conical wall 11'' of the cone 19'' forms a biangular nozzle with conduit 12'' at orifice 10'' in accordance with the principles set forth above in connection with FIGS. 1 and 2.

There has been described above in connection with FIGS. 3 to 6, 7 and 8 several forms of spray units embodying the spray nozzle of the invention. In each spray unit, the pressure nozzle has an orifice which increases the dynamic pressure head relative to the static pressure head. A conical wall at the orifice extends longitudinally along the liquid flow path from a point upstream to a point downstream of the orifice. The portion of the conical wall downstream of, and exterior to, the orifice has a base diameter at least the effective diameter of the orifice for traversing the path of liquid flow from the conduit wall; the portion of the conical wall upstream of, and interior to, the orifice has a length sufficient to form a first unidirectional conical sheet of liquid which is laminar adjacent to the conical wall. The conical sheet is conducted from inside to outside of the orifice along the conical wall. A tubular sheet of liquid is similarly generated on the conduit wall, upstream of, and interior to, the orifice, and is conducted for intersection at the acute angle with the conical sheet at a point outside the orifice. The depth of each liquid sheet so formed is thin relative to its circumferential radius. The resulting conical stream formed by the collision of the two thin liquid sheets is unstable and shatters into droplets as it is projected into the atmosphere. The intersection of the laminar sheets of liquid produces a stream that disrupts in a predictable manner into droplets of an optimum size and number, and which can be predictably varied by adjusting the size of the nozzle orifice. The surface of the orifice walls forming the liquid sheets have dimensions and are configurations sufficient to generate and maintain a unidirectional sheet of liquid on each wall from an area inside the orifice to an area of collision of the sheets prior to the discharge end of the conical wall outside of the orifice thereby resulting in an emerging unstable stream which disrupts into droplets of predictable size as the stream is projected into the atmosphere. Moreover, the relative pressure and amounts of each of the conical and tubular sheets of liquid so formed are such that their collision produces an unstable stream that disrupts into the desired droplet size as the stream is projected into the atmosphere. The advantage of the invention should be clear from the foregoing description. The spray is substantially free from droplets of a size, for example of a size less than 30 microns, that will form a mist which will drift. The nozzle of the invention may be employed in many different types of spray units to meet the needs, circumstances and desiderata of many different situations.

In the drawing and specification, there has been set forth preferred embodiments of the invention, and although specific terms are employed, these are used in a generic and descriptive sense only, and not for the purpose of limitation. Changes in form and proportion of parts, as well as substitution of equivalents are contemplated, as circumstances may suggest or render expedient, without departing from the sprit and scope of this invention, as further defined in the following claims.

We claim:

1. A device for spraying liquid under pressure into the atmosphere, and which is adapted to effect improved cooling, aeration, condensing, humidification, or stripping of dissolved or entrained gases, comprising in combination:

a nozzle on said spray device for projecting liquid in an upward trajectory into the atmosphere, conduit means provided with an outlet end for supplying liquid under pressure to the nozzle, said conduit means having an interior tubular wall member of a fixed diameter throughout the axial extent thereof adjacent said outlet end and in the nozzle portion in order to form a tubular sheet of liquid, an inverted conical wall member having a discharge end and an inlet end, said inlet end positioned upstream from the outlet end of said conduit means, said conical wall discharge end provided with an abrupt discharge edge of a diameter greater than the interior diameter of said tubular wall member, said conical wall inlet end positioned upstream from the outlet end of said conduit means a distance and having a diameter sufficient to form and conduct a conical sheet of liquid on the surface of said conical wall member toward the discharge end, said conical wall member spaced from the conduit means outlet end to form an orifice therewith having a hydraulic orifice area substantially less than the hydraulic cross-sectional area of said conduit means for increasing the dynamic pressure to static pressure of the liquid at such orifice, said conduit means outlet end provided with an abrupt discharge edge spaced from said conical wall at a position and of a diameter so that the tubular sheet of liquid formed on said interior tubular wall will intersect the conical sheet of liquid at a location on said conical wall member upstream from and adjacent said discharge end to create turbulence in the resulting stream so that it will shatter and break into droplets as it is projected into the atmosphere, and means for supplying liquid to said nozzle under pressures sufficient to project the stream discharged from the nozzle into the atmosphere.

2. The device of claim 1 in which said conical wall member is formed along the surface of a right cone.

3. The device of claim 1 in which said conical wall member is adjustable relative to the conduit in order to vary the size of the nozzle orifice.

4. The device of claim 1 in which said conical wall is rotated.

5. The device of claim 1 in which said conical wall is fixed relative to said conduit means.

6. The device of claim 1 in which said conical wall is free wheeling on a shaft.

7. A nozzle for spraying liquid and which is adapted to optimize the size and number of droplets produced thereby, comprising in combination:

conduit means provided with an outlet end for supplying liquid under pressure to the nozzle, said conduit means having an interior tubular wall member of a fixed diameter throughout the axial extent thereof adjacent said outlet end in order to form a tubular sheet of liquid along the conduit wall member, an inverted conical wall member formed of right cone having a discharge end and an inlet end, said inlet end positioned upstream from the outlet end of said conduit means, said conical wall discharge end provided with an abrupt discharge edge of a diameter greater than the interior diameter of said tubular wall member, said conical wall inlet end positioned upstream from the outlet end of said conduit means a distance and having a diameter sufficient to form and conduct a conical sheet of liquid on the surface of said conical wall member toward the discharge end, said conical wall member spaced from the conduit means outlet end to form an orifice therewith having a hydraulic orifice area substantially less than the hydraulic cross-sectional area of said conduit means for increasing the dynamic pressure to static pressure of the liquid at said orifice, said conduit means outlet end provided with an abrupt discharge edge spaced from said conical wall at a position and of a diameter so that the tubular sheet of liquid formed on said conduit wall will intersect the conical sheet of liquid at a location on said conical wall member upstream from and adjacent said conical wall discharge end to create turbulence in the resulting stream so that it will shatter and break into droplets as it is projected into the atmosphere.

8. The nozzle of claim 7 further characterized by the fact that said conical wall member has the surface of a right cone which is positioned so as to form an acute angle with said conduit means in range from about 10° to about 30°.

9. The nozzle of claim 7 further characterized in that the angle between said conical wall member and said conduit means is about 30°.

10. The nozzle of claim 7 in which said conical wall member is adjustable relative to the conduit in order to vary the size of the nozzle orifice.

11. The nozzle of claim 7 in which said conical wall is rotated.

12. The nozzle of claim 7 in which said conical wall is fixed relative to said conduit means.

13. The nozzle of claim 7 in which said conical wall is free wheeling on a shaft.

14. A method for spraying a conical stream of liquid into the atmosphere, and which is adapted to optimize the size and number of droplets, comprising:

forming a conical sheet of liquid under pressure on an inverted conical wall member upstream to a nozzle orifice, conducting said conical sheet of liquid along said conical wall member beyond the orifice into the atmosphere, forming a tubular sheet of liquid under pressure upstream to the nozzle orifice, each of said conical and tubular sheets of liquid being thin relative to its circumferential radius, and directing said tubular liquid sheet at a location on the conical wall that intersects said conical liquid sheet a short distance before said conical sheet leaves the conical wall member, said conical and tubular sheets at relative pressures and in amounts so that the resulting stream is unstable and disrupts into droplets as it is projected into the atmosphere.

15. The method of claim 14 which further comprises the step of adjusting the hydraulic area of the orifice in order to control the size and number of droplets in the resulting stream.

16. The method of claim 14 in which said conical sheet is generated in the form of the conical surface of a right cone upstream to the nozzle orifice.

17. A method for spraying liquid from a nozzle orifice, and which is adapted to optimize the size and number of droplets, comprising:

supplying liquid under pressure to the nozzle orifice, substantially increasing the dynamic pressure to the static pressure of the liquid at the nozzle orifice, forming an inverted conical sheet of liquid under pressure on a conical wall member upstream to the nozzle orifice, conducting said conical sheet of liquid along said wall member beyond the nozzle orifice into the atmosphere, forming a tubular sheet of liquid under pressure upstream to the nozzle orifice, each of said conical and tubular sheets of liquid being thin relative to its circumferential radius, and directing said tubular sheet of liquid so that it intersects said conical liquid sheet before said conical liquid sheet leaves the wall member so that the resulting conical stream of liquid disrupts into droplets substantially free from droplets of sizes smaller than 30 microns which will form a mist that will drift.

18. The method of claim 17 in which said conical sheet is generated in the form of the conical surface of a right cone upstream to the nozzle orifice.

19. The method of claim 18 in which said conical sheet is formed at an acute angle with respect to said tubular sheet in the range from about 10° to about 80°.

20. The method of claim 17 in which said conical sheet is formed at an acute angle with respect to said tubular sheet of about 30°.

* * * * *